June 30, 1925.  
W. S. WALKER ET AL  
1,543,810  
RETAINER FOR FLOOR BOARDS  
Filed Jan. 6, 1925
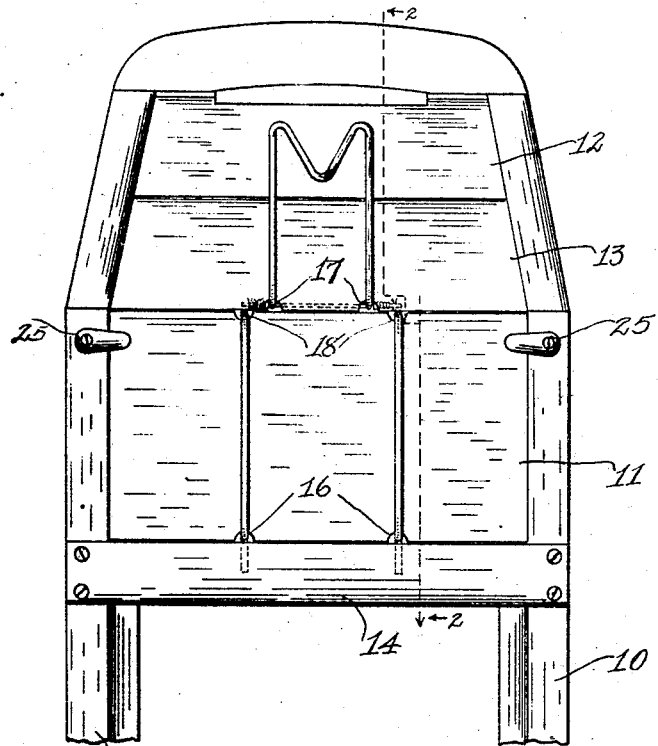
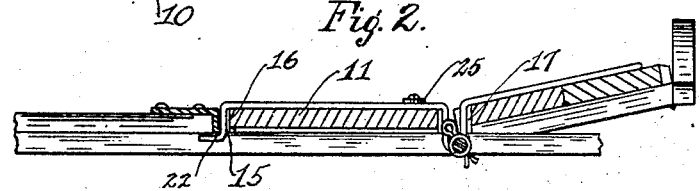
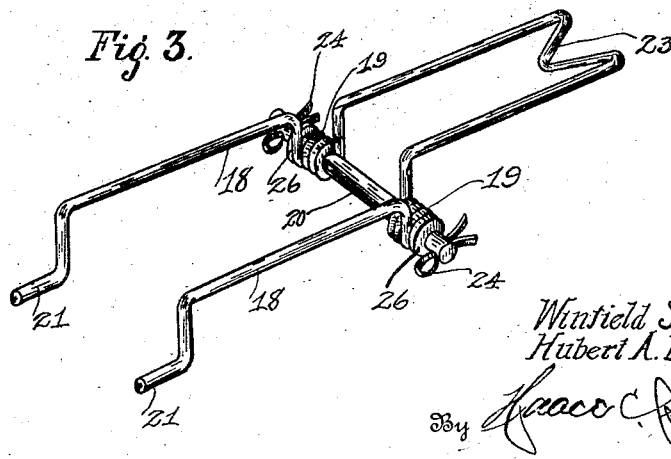
Inventors  
Winfield S. Walker  
Hubert A. Birdwell.  
By  
Attorney Patented June 30, 1925.

1,543,810

UNITED STATES PATENT OFFICE.

WINFIELD S. WALKER AND HUBERT A. BIRDWELL, OF LIMESTONE, TENNESSEE.

RETAINER FOR FLOOR BOARDS.

Application filed January 6, 1925. Serial No. 863.

*To all whom it may concern:*

Be it known that we, WINFIELD S. WALKER and HUBERT A. BIRDWELL, citizens of the United States, residing at Limestone, in the county of Washington, State of Tennessee, have invented certain new and useful Improvements in Retainers for Floor Boards; and we do hereby declare the following to be a full, clear, and exact description of the invention, such as will enable others skilled in the art to which it appertains to make and use the same.

This invention relates to new and useful improvements in automobile attachments, and particularly to attachments for the floor boards of automobiles.

In some types of automobiles, the floor boards are not secured in place, and when the automobile strikes an obstruction or depression these boards jump from their seats, and interfere with the operation of the control pedals. Also, while passing over rough roads or streets, these boards rattle and chatter. It is therefore the principal object of the present invention to provide a device which is readily applicable to the floor board sections, and which will hold the boards against rattling and chattering, as well as against jumping from their seats.

Other objects and advantages will be apparent from the following description when taken in connection with the accompanying drawing.

In the drawing:

Figure 1 is a top plan view of the floor boards of an automobile, showing the invention in position.

Figure 2 is a vertical sectional view on the line 2—2 of Figure 1.

Figure 3 is a perspective view of the attachment removed from the floor boards.

Referring particularly to the accompanying drawing, 10 represents the side bars of the chassis of the automobile on which are supported the horizontal floor board section 11, and the inclined sections 12 and 13. Secured to, and extending between the chassis bars, is a bar 14, in the forward edge portion of which there is formed the longitudinally extending ledge 15, on which rests the rear edge portion of the board section 11. In the front and rear edges of this board 11 there are formed the notches 16, while in the lower edge of the section 13 there are formed the notches 17.

The attachment is formed from a single length of suitable stiff wire, or flat metal, and has the intermediate portions of its legs 18 formed with coil turns 19, which are engaged around a bolt or pin 20. The portions of the legs 18, rearwardly of the coils 19 rest on the upper face of the board 11, and transversely of the intermediate portion thereof, their ends being rebent as at 21, to engage in the notches 16, of the rear edge of the board 11, and in notches 22, formed in the ledge portion of the transverse bar 14, said ends extending rearwardly beneath said ledge. The portions of the legs 18, forwardly of the coils 19 rest on the upper faces of the inclined board sections 12 and 13, transversely thereof, and on the intermediate portion of said faces, said leg portions being connected by the indented bight portion 23. Through the ends of the pin 20 are disposed the cotter pins or split keys 24, the eye portions of which engage in the lower portions of the forward notches 16. The portions of the legs 18, adjacent the coils 19 engage in the said forward notches 16, and in the notches 17 of the section 13 of the floor board.

The board section 11 is engaged, adjacent its edges, by the buttons 25, which are carried by the chassis.

From the foregoing it will be seen that the resiliency of the leg portions of the device serve to exert pressure on the inclined sections 12 and 13, whereby to hold them firmly in their seats, and thus prevent rattling and chattering thereof. Also, the pressure of the device serves to prevent these sections from jumping from their seats and becoming entangled in the control pedals. The device is, however, of such construction, that it may be readily sprung away from the board sections, to permit easy and quick removal of such boards, when necessary.

The device is extremely simple in construction, and is readily adapted for attachment to the ordinary automobile.

On the ends of the pin 20, between the split keys 24 and the coils 19, there are disposed washers 26, whereby the flexing movement of the upper or forward portions of the legs 18 is rendered smoother, and without wear on the pin or coils.

What is claimed is:

1. In a floor board retaining device for an automobile, the combination with the horizontal board section and the inclined board sections, of means engaged with the chassis of the automobile and with the horizontal board section and having resilient leg portions engaged in retaining relation to the inclined board sections.

2. The combination with the horizontal and inclined board sections of the floor of an automobile, of a spring member having intermediate coil portions disposed between the horizontal and inclined sections, the portion of the spring member at one side of the coil portions being engaged with the chassis of the automobile and with the said horizontal section, and the portion of the spring member at the other side of the coil portions resiliently engaging the inclined sections to retain said sections against rattling and displacement from their seats.

In testimony whereof, we affix our signatures, in the presence of two witnesses.

WINFIELD S. WALKER.
HUBERT A. BIRDWELL.

Witnesses:
J. F. NELSON,
R. M. ANDERSON.